United States Patent [19]

Ohtani et al.

[11] Patent Number: 4,869,979
[45] Date of Patent: Sep. 26, 1989

[54] CONDUCTING ORGANIC POLYMER BATTERY

[75] Inventors: Akira Ohtani; Masao Abe; Hiroyuki Higuchi, all of Osaka, Japan

[73] Assignee: Nitto Electric Industrial Co., Ltd., Osaka, Japan

[21] Appl. No.: 229,474

[22] Filed: Aug. 8, 1988

[30] Foreign Application Priority Data

Aug. 10, 1987 [JP] Japan ................. 62-199434
Mar. 18, 1988 [JP] Japan ................. 63-66068

[51] Int. Cl.$^4$ ............................................. H01M 4/60
[52] U.S. Cl. .................................... 429/191; 429/194; 429/213
[58] Field of Search ............... 429/213, 191, 192, 194

[56] References Cited

U.S. PATENT DOCUMENTS

| 4,442,187 | 4/1984 | MacDiarmid et al. | 429/213 |
| 4,582,587 | 4/1986 | Hotta et al. | 429/213 X |
| 4,728,589 | 3/1988 | MacDiarmid et al. | 429/213 |
| 4,740,436 | 4/1988 | Kobayashi et al. | 429/194 |
| 4,801,512 | 1/1989 | MacDiarmid et al. | 429/213 |

Primary Examiner—Anthony Skapars
Attorney, Agent, or Firm—Sughrue, Mion, Zinn, Macpeak & Seas

[57] ABSTRACT

A conducting organic polymer battery is disclosed, which comprises a cathode comprising a conducting organic polymer doped with a polymer anion having a number of anionic groups in the molecule thereof, an anode comprising a metal having a redox potential lower than that of the conducting organic polymer, and an electrolyte solution or a solid electrolyte as an ion conductive phase. In the battery, the ion concentration in an electrolyte solution does not substantially change during charging and discharging.

10 Claims, 3 Drawing Sheets

FIG. 1A

AT DISCHARGING

FIG. 1B

AT CHARGING

AT DISCHARGING

FIG.4B

AT CHARGING

CONDUCTING ORGANIC POLYMER BATTERY

FIELD OF THE INVENTION

This invention relates to a conducting organic polymer battery, and more particularly a battery containing a conducting organic polymer doped with a polymer anion as a cathode and a metal as an anode, wherein an ion concentration of an electrolyte solution therein does not substantially change during charging and discharging.

BACKGROUND OF THE INVENTION

It is known that a combination of a p-type conducting organic polymer as a cathode and a metal having a lower redox potential than that of the polymer as an anode can provide a secondary battery capable of charging and discharging as described, e.g., in U.S. Pat. No. 4,442,187, D. MacInnes et al., *J. Chem. Soc., Chem. Commun.*, 317 (1981), A. G. MacDiarmid et al., *J. Electrochem. Soc.*, Vol. 128, 1651 (1981), and JP-A-No. 61-200669 (the term "JP-A" as used herein means "unexamined published Japanese patent application").

p-Type conducting organic polymers which have conventionally been used in the above-described secondary batteries are polymers that are cationic by themselves and are doped with a low molecular weight anion, such as perchlorate, chlorine and tetrafluoroborate ions. On reduction in an electrolyte solution, they become neutral by releasing the anion and, on reoxidation, capture again the anion as a dopant. In other words, the p-type conducting organic polymers having a low molecular weight anion as a dopant have a reversible anion-incorporating ability.

On the other hand, the metal to be used as an anode becomes a metal ion upon oxidation in an electrolyte solution and the metal ion is dissolved in the electrolyte solution. On re-reduction, the metal ion is precipitated as a metal.

Figure 4A:
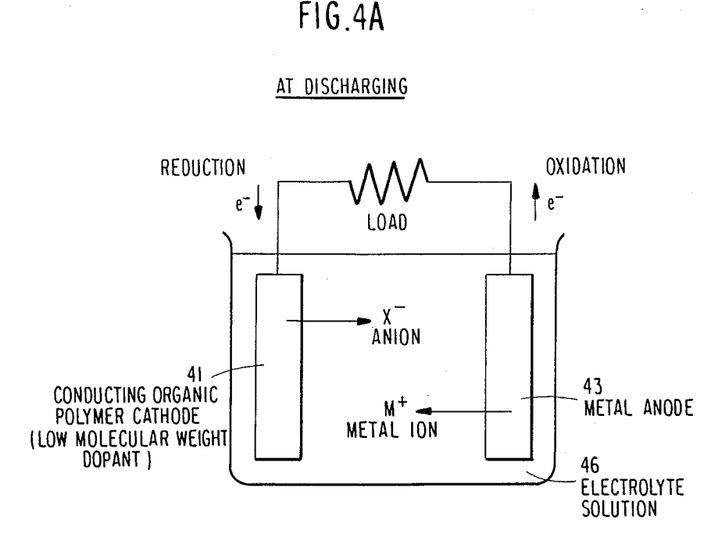
FIGS. 4A and 4B are diagrams showing the ion migration behaviors in the conventional battery.
Figure 4B:
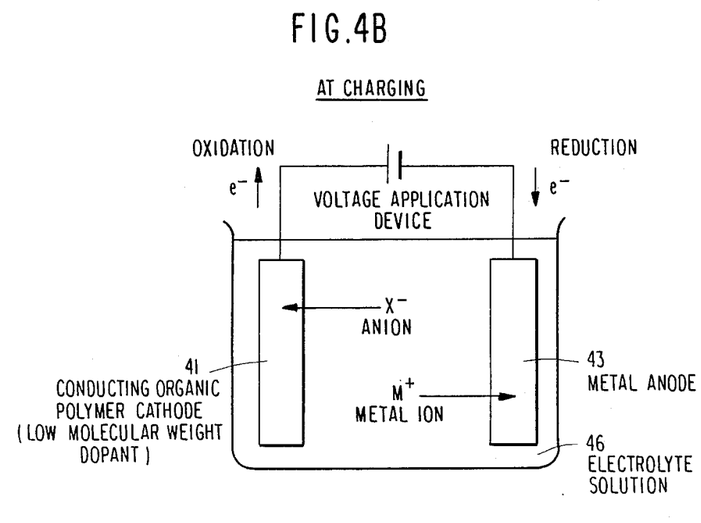

FIGS. 4A and 4B illustrate a conventional battery in which cathode 41 comprises the above-described conducting organic polymer which is cationic and is doped with a low molecular weight anion and anode 43 comprises a metal. In the conventional battery, during discharge, anion $X^-$ is released from the cathode and cation $M^+$ (metal ion) is dissolved from the anode, whereby the ion concentration in the electrolyte solution 46 considerably increases. On the other hand, these reactions are reversed during charging. That is, anion $X^-$ is incorporated by the cathode and metal ion $M^+$ precipitates as a metal on the anode, whereby the ion concentration in the electrolyte solution 46 markedly decreases. It is therefore apparent that the charging and discharging characteristics of batteries of this type depend on diffusion of both the metal ion and the anion.

In these conventional batteries, it is necessary to use an unsaturated electrolyte solution in excess relative to the volume of the conducting organic polymer and the metal as the electrode active materials, from considerations that the ions released from both cathode and anode on discharging should be dissolved in the electrolyte solution and that the internal resistance of the battery should be reduced by maintaining a sufficient ion concentration of the electrolyte solution during charging. Therefore, although the batteries have a relatively high energy density as calculated from only the weight of the electrode active materials, they have a seriously poor energy density when taking the weight of the electrolyte solution into consideration, which has been a serious problem to their practical application.

The inventors previously proposed p-type conducting organic polymers doped with a high molecular weight polymer having a number of anionic groups in the molecule thereof (hereinafter referred to as a "polymer anion") in place of the above-described low molecular weight anion, as reported in Ohtani et al., Polymer Preprints Jpn. No. 34, 2829 (1985). In marked contrast to the p-type conducting organic polymer doped with a low molecular weight anion, since the polymer anion as a dopant is hardly diffusible in the conducting organic polymer because of its high molecular weight, the conducting organic polymer incorporates a cation in the electrolyte solution within its molecule by reduction of the conducting organic polymer in the electrolyte solution and then releases the cation thus incorporated upon re-oxidation of the conducting organic polymer. That is, the p-type conducting organic polymer doped with the polymer anion possesses a reversible cation-incorporating ability.

There has also been proposed a plastic battery containing the above-described conducting organic polymer doped with a low molecular weight anion as a cathode and a conducting organic polymer doped with the above-described polymer anion as an anode as disclosed in Japanese Patent Application No. 61-214816. This type of battery also requires an electrolyte solution in excess.

SUMMARY OF THE INVENTION

Accordingly, one object of this invention is to provide a polymer battery, in which an ion concentration in an electrolyte solution is substantially unchanged thereby to minimize the requisite amount of the electrolyte solution and to have a high energy density.

Another object of this invention is to provide a battery wherein the charging and the discharging characteristics of the battery depend on diffusion of a metal ion unlike those using a conducting organic polymer doped with a low molecular weight anion as a cathode.

It has now been found that the above objects can be accomplished by using a p-type conducting organic polymer doped with a polymer anion as a cathode utilizing the above-described characteristics thereof and a metal having a lower redox potential than that of the conducting organic polymer as an anode.

The conducting organic polymer battery according to the present invention comprises a cathode comprising a conducting organic polymer doped with a polymer anion having a number of anionic groups in the molecule thereof, an anode comprising a metal having a redox potential lower than that of the conducting organic polymer, and an electrolyte solution or solid electrolyte as an ion-conductive phase.

DETAILED DESCRIPTION OF THE INVENTION

The conducting organic polymer which can be used as a cathode is a p-type semi-conductor which is cationic per se and is doped with a polymer anion. Examples of such a conducting organic polymer are polymers obtained by electrolytic oxidative polymerization, chemical oxidative polymerization or photooxidative polymerization of heterocyclic compounds, e.g., pyrrole, pyrrole derivatives having a substituent at the nitrogen atom, 3- and/or 4-positions thereof, thiophene, thiophene derivatives having a substituent at the 3- and/or 4-positions thereof, etc., or aromatic compounds, e.g., aniline, alkyl-substituted anilines, phenol, thiophenol, and derivatives thereof; and poly(p-phenylene), polyacetylene, and so on. In the battery of the present invention, it is particularly preferred to use as a cathode a p-type conducting organic polymer of high redox potential. Of the above-described p-type conducting organic polymers, polythiopene, polyaniline, polyalkylanilines, poly-N-methylpyrrole, polypyrrole, poly(p-phenylene) and polyacetylene are preferably used.

Examples of the polymer anion to be used as a dopant include polyvinylsulfonic acid, polyvinylsulfuric acid, polystyrenesulfonic acid, a sulfonated styrenebutadiene copolymer, polyallylsulfonic acid, polymethallylsulfonic acid, poly-2-acrylamide-2-methylpropanesulfonic acid, a halogenated acrylic acid polymer, etc. In addition, fluorine-containing polymers commercially available under a tradename of "Nafion" (products of E. I. Du Pont, U.S.A) are also useful as a polymer anion. These polymers have a number of sulfonic acid on the molecular side chain thereof. In the present invention, the polymer anion is not limited to the above materials.

The conducting organic polymer comprising a composite of the p-type conducting organic polymer and the polymer anion as a dopant can be obtained by conventional methods as described, e.g., Chem. Lett., Vol. 1986, 687 and JP-A-59-98165, in which the above-described polymer anion is dissolved in a solution of a monomer capable of forming the conducting organic polymer and the monomer is oxidatively polymerized in the solution. The manner of oxidative polymerization is not particularly restricted and can be selected appropriately from electrolytic oxidation, chemical oxidation and photo-oxidation.

In more detail, the conducting organic polymer doped with the polymer anion can be obtained effectively by a method comprising dissolving the monomer in an electrolyte solution having dissolved therein, for example, a salt comprising a polymer anion and its counter cation or only an acid-type polymer anion, and subjecting the monomer to electrolytic oxidative polymerization in the solution; a method comprising dispersing or dissolving an oxidizing agent which forms no anion species after being reduced, e.g., manganese dioxide, a bichromate, etc., in a solution, mixing the resulting solution with a solution having dissolved therein an acid-type polymer anion and the monomer, and subjecting the monomer to chemical oxidative polymerization; a method comprising mixing ferric hydroxide, an acid type polymer anion, and the monomer in a solution, and subjecting to chemical oxidative polymerization; or the like technique.

The metal which can be used in the present invention as an anode is a metal having a lower redox potential than that of the above-described conducting organic polymer. Lithium, zinc, and magnesium are preferably used.

In the battery according to the present invention, by using the p-type conducting organic polymer having a cation-incorporating ability at reduction as a cathode, using the metal having a redox potential lower than that of the conducting organic polymer as an anode, immersing both the cathode and anode in an electrolyte solution, and connecting the cathode and anode electrically, the battery wherein electricity passes from the cathode toward the anode can be obtained. The battery of the present invention can be regenetrated, namely charged, by applying a proper voltage between the two electrodes via a potential loading device to causes a reversed electrode reaction.

The solvent for the electrolyte solution as an ion-conductive phase usually includes organic solvent, e.g., propylene carbonate, dimethoxyethane, acetonitrile, trimethoxymethane, sulforan, dimethyl sufoxide, dimethylformamide, γ-butyrolactone, benzonitrile, N-methyl-2-pyrrolidone or dimethylacetamide, water, and. mixed solvents of water and the above-enumerated organic solvents. In particular, the solvent to be used is preferably selected from those which exhibit low reactivity with each of the cathode comprising the conducting organic polymer and the metal anode, do not participate in the redox reaction during charge and discharge, and are not liable to deterioration.

The electrolyte is not particularly limited. Examples thereof include lithium tetrafluoroborate, lithium perchlorate, lithium hexafluorophosphate, lithium hexafluoroarsenate, zinc sulfate, zinc chloride, magnesium chloride, magnesium sulfate, etc. Preferred examples are appropriately selected from those containing the same metal component and used in the metal anode and whose anion component in the electrolyte does not participate in the redox reaction during charge and discharge.

In place of the electrolyte solution comprising the electrolyte and the solvent, a solid electrolyte such as a film of "Nafion" which is a solid polymer electrolyte or a film of polyethylene oxide or polypropylene oxide having incorporated therein an electrolyte can be used.

Figure 1A:
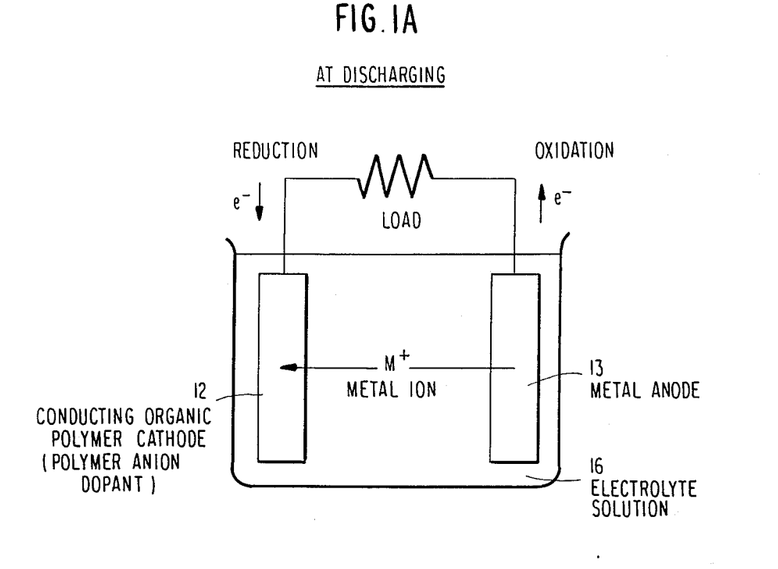
FIGS. 1A and 1B are diagrams showing the ion migration behaviors in the battery of the present invention during charging and discharging, respectively.
Figure 1B:
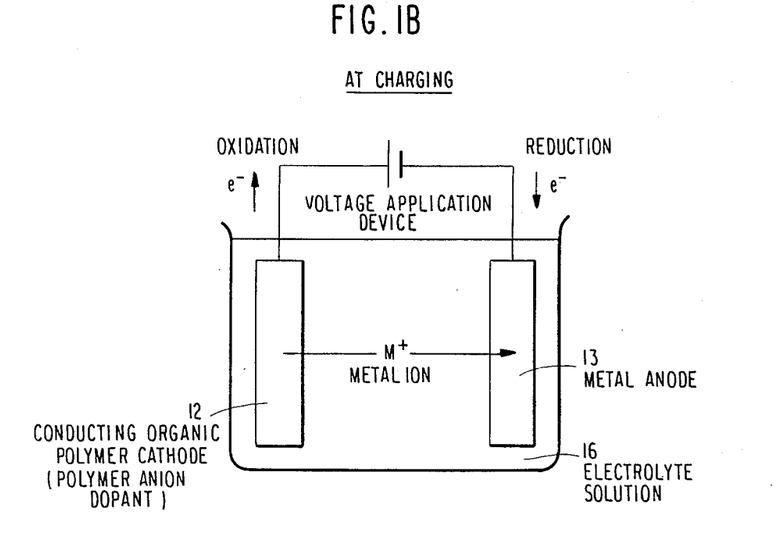

The electrode reaction in the battery of the present invention will be described in detail by referring to FIGS. 1A and 1B. In FIGS. 1A and 1B, metal anode 13 releases metal ion $M^+$ into electrolyte solution 16 by oxidation reaction at the time of discharge. At the same time, cathode 12 comprising the p-type conducting organic polymer having a cation-incorporating ability undergoes reduction to incorporate the thus released cation $M^+$ (metal ion). As a result, the ion concentration in the electrolyte solution remains substantially unchanged as a whole.

At the time of discharge, in turn, a reverse voltage is applied between the electrodes to oxidize the p-type conducting organic polymer having a cation-incorporating ability and, at the same time, reduce the metal ion. As a result, the conducting organic polymer releases the cation $M^+$ into the solution and the released metal ion $M^+$ is precipitated as a metal on the anode to thereby regenerated the battery. Accordingly, the ion concentration in the electrolyte solution does not substantially change during charging.

It would be apparently understood that the charge and discharge characteristics of the battery according to the present invention depend on diffusion of the metal ion unlike the conventional batteries using, as a cathode, an conducting organic polymer doped with a low molecular weight anion.

As described above, since the battery of this invention uses a p-type conducting organic polymer having a cation-incorporating ability at reduction as a cathode and a metal as an anode, the ion concentration in the electrolyte solution does not change substantially during charging and discharging.

Hence, the battery of the present invention does not require an excess amount of an electrolyte solution for dissolving ions released during discharge. Further, since a highly concentrated electrolyte solution can be used, the requisite amount of the electrolyte solution can be so much reduced. The present invention thus provides a polymer battery having a small internal resistance and a high energy density.

When, in particular, compared with the conventional batteries using the above-described conducting organic polymer doped with a low molecular weight anion as a cathode, the battery of the present invention has an energy density enough for practical use, with the weights of the cathode active material and the electrolytic solution being taken into consideration, even when the weight of the electrolyte solution is 3 times or less the weight of the conducting polymer.

The present invention is now illustrated in greater detail by reference to the following Reference Examples, Examples, and Comparative Examples, but it should be understood that the present invention is not deemed to be limited thereto. In these examples, all the percents are by weight unless otherwise indicated.

REFERENCE EXAMPLE 1

Synthesis of Polyvinylsulfonic Acid-1

Water was removed from 160 g of a 25% aqueous solution of sodium vinylsulfonate (produced by Tokyo Chemical Industry Co., Ltd.) by using a rotary evaporator to concentrate to a weight of 87 g (concentration: 46%).

The whole amount of the concentrated aqueous solution of sodium vinylsulfonate was placed in a separable flask equipped with a stirrer, a means for introducing nitrogen, and a condensor, and nitrogen was then bubbled into the solution for 10 minutes.

In 12.3 g of distilled water were dissolved 0.213 g of potassium peroxodisulfate and 0.108 g of sodium hydrogensulfite to prepare an aqueous solution of a redox initiator. The resulting solution was added to the solution in the separable flask, followed by stirring at room temperature. About 1 hour later, an increase in viscosity of the solution was observed.

After the mixture was allowed to react for 3 hours, the reaction mixture was poured into 700 ml of methanol while stirring thereby to form a white precipitate. The precipitate was collected by filtration using a glass filter, thoroughly washed with metanol, and dried in vacuo at 70° C. for 8 hours to obtain 33.6 g (84%) of sodium polyvinylsulfonate as a white powder.

The resulting polymer had a logarithmic viscosity number of 0.20 (0.5 g/dl, 30° C., in water). When viscosity was measured by means of a Ubbelohde's viscometer while decreasing the polymer concentration, the polymer showed a phenomenon called low concentration abnormality in which both of logarithmic viscosity number and reduced viscosity increase as the concentration decreases. This means that the resulting polymer is a high polymeric electrolyte.

13 g of the resulting sodium polyvinylsulfonate was dissolved in 74 g of distilled water to prepare a 15% aqueous solution. A glass-made column packed with an H-type strongly acidic cation exchange resin ("Dowex 50 WX 2, H type" produced by Dow Chemical Co., Ltd.) was thoroughly washed with distilled water until the effluent became neutral. The above-prepared sodium polyvinylsulfonate aqueous solution was passed through the column by means of a quantitative pump. From the point when the effluent turned to acidic, the effluent was collected until it became neutral.

About 200 ml of the thus collected fraction was treated by a rotary evaporator to remove water. The resulting viscus solution was dried in vacuo at 80° C. for 5 hours to sufficiently remove any remaining water content to thereby obtain 10 g of polyvinylsulfonic acid as a brown syrupy solution.

REFERENCE EXAMPLE 2

Synthesis of Polyaniline Doped with Polyvinylsulfonic Acid

In a 200 ml-volume glass-made reactor was charged 81 g of distilled water, and 8.65 g of the polyvinylsulfonic acid as prepared in Reference Example 1 was dissolved therein to form a solution. The resulting solution showed strong acidicity.

3.73 g (0.04 mol) of aniline was added to the polyvinylsulfonic acid aqueous solution, and dissolved therein under stirring. The solution was cooled with ice-water, and at 5° C., 3.48 g (0.04 mol) of a manganese dioxide power was added thereto in small portions. Immediately after the addition of manganese dioxide, the reaction mixture changed to green and, immediately thereafter, a blackish green solid was formed. Manganese dioxide was added over a period of about 30 minutes, and the stirring was continued for an additional 1.5 hours.

After completion of the reaction, the reaction mixture was added to 500 ml of distilled water under stirring, and the produced polyaniline powder was then filtered through a filter glass G4 and subjected to ultrasolic cleaning in distilled water. The ultrasolic cleaning was repeated twice more using fresh distilled water, whereby it was confirmed that the washing became neutral.

The polymer powder was repeatedly washed with acetone until the washing became colorless and then vacuum-dired in a desiccator at room temperature for 5 hours to obtain 3.99 g of the polyaniline as a bright green powder. As a result of elementary analysis, the polymer was found to contain 6.1% of sulfur. The electric conductivity of the polymer was 0.64 S/cm as measured in accordance with a Van Der Pauw method.

EXAMPLE 1

500 mg of the conducting polyaniline powder doped with polyvinylsulfonic acid as prepared in Reference Example 2 were pressed using a tableting press at a pressure of 2,260 kg/cm$^2$ to obtain a disc having a diameter of 13 mm.

Figure 2:
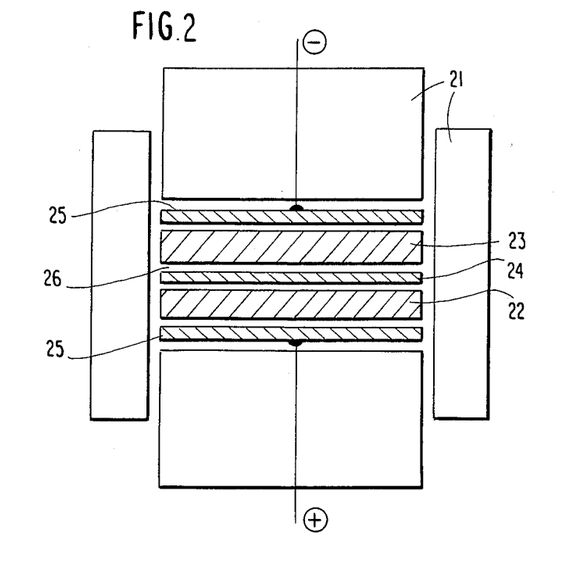
FIG. 2 is a cross sectional view of the battery produced in Examples and Comparative Examples.

As shown in FIG. 2, a battery was produced by assembling the thus obtained disc as cathode 22, 250 mg of a zinc foil having a thickness of 0.25 mm and having a diameter of 14 mm as anode 23, a filter paper as a separator 24, and 0.3 ml of a 1 mol/l zinc sulfate aqueous solution (specific gravity: 1.17) as an electrolyte solution 26 in a battery cell 21. A platinum electrode having a diameter of 14 mm was used as an electrode 25 for collecting an electric current. The weight of the electrolyte solution was 0.7 times that of the polyaniline.

The open-circuit voltage of the battery was 1340 mV. The voltage gradually decreased by constant current discharge at 3.85 mA (2.5 mA/cm$^2$). The quantity of electricity discharged until the voltage decreased to 700 mV was 54 C. Accordingly, the energy density of the battery was found to be 28 Wh per kg of the polyaniline and 17 Wh per kg of the total weight of the polyaniline and the electrolyte solution.

The zinc concentration in the electrolyte solution after electric discharge of 54 C was 0.97 mol/l as measured by atomic-absorption spectroscopy, witch was substantially unchanged from the before discharge.

Further, the discharged battery could be recharged.

EXAMPLE 2

A battery was produced in the same manner as in Example 1, except that a disc tableted from 250 mg of the polyaniline doped with polyvinylsulfonic acid was used as a cathode and the amount of the electrolyte solution was changed to 0.6 ml. In this case, the weight of the electrolyte solution was 2.8 times that of the polyaniline.

The open-circuit voltage of the battery was 1,340 mV, and the voltage gradually decreased through constant current discharge at 3.85 mA (2.5 mA/cm$^2$). The quantity of electricity discharged until the voltage decreased to 700 mV was 29C. Accordingly, the energy density of the battery was 30 Wh per kg of the polyaniline and 7.9 Wh per kg of the total weight of the polyaniline and the electrolyte solution.

The zinc concentration in the electrolyte solution after discharge of 29 C was 1.01 mol/l as measured by atomic-absorption spectroscopy, which was substantially unchanged from that before discharge.

The discharged battery could be recharged.

EXAMPLE 3

A battery was produced in the same manner as in Example 1, except that a disc tableted from 250 mg of the polyaniline doped with polyvinylsulfonic acid was used as a cathode and the amount of the electrolyte solution was changed to 0.8 ml. In this case, the weight of the electrolyte solution was 3.7 times that of the polyaniline.

The open-circuit voltage of the battery was 1,340 mV, and the voltage gradually decreased through constant current discharge at 3.85 mA (2.5 mA/cm$^2$). The quantity of electricity discharged until the voltage decreased to 700 mV was 31 C. Accordingly, the energy density of the battery was 32 Wh per kg of the polyaniline and 6.8 Wh per kg of the total of the polyaniline and the electrolyte solution.

The zinc concentration in the electrolyte solution after discharge of 31 C was 0.99 mol/l as measured by atomic-absorption spectroscopy, which was substantially unchanged from that before discharge.

The discharged battery could be recharged.

REFERENCE EXAMPLE 3

Synthesis of Polyaniline Doped with Sulfuric Acid

In a 200 ml-volume glass-made rector was charged 97 g of distilled water, and 14.7 g (0.15 mol) of sulfuric acid, and 4.66 g (0.05 mol) of aniline were then added thereto, followed by stirring. To the resulting solution was added 4.35 g (0.05 mol) of manganese dioxide powder in small portions while maintaining the temperature of the solution at 6° C. by cooling with ice-water. Thereafter, the reaction mixture was treated in the same manner as in Reference Example 2 to obtain 3.64 g of a conducting polyaniline doped with sulfuric acid. The resulting polymer had an electric conductivity of 4.9 S/cm.

COMPARATIVE EXAMPLE 1

A battery was produced in the same manner as in Example 1, except for using, as a cathode, a disc molded from 500 mg of the polyaniline doped with sulfuric acid as prepared in Reference Example 3.

The open-circuit voltage of the battery was 1,320 mV, and the voltage gradually decreased through constant current discharge at 3.85 mA (2.5 mA/cm$^2$). The quantity of electricity discharged until the voltage decreased to 700 mV was 31 C. Accordingly, the energy density of the battery was 15 Wh per kg of the polyaniline and 8.6 Wh per kg of the total weight of the polyaniline and the electrolyte solution.

The zinc concentration in the electrolyte solution after discharge of 31 C was 1.51 mol/l as measured by atomic-absorption spectroscopy, indicating a remarkable increase as compared with the concentration before discharge.

COMPARATIVE EXAMPLE 2

A battery was produced in the same manner as in Example 2, except for using, as a cathode, a disc molded from 250 mg of the polyaniline doped with sulfuric acid prepared in Reference Example 3.

The open-circuit voltage of the battery was 1,330 mV, and the voltage gradually decreased by constant current discharge at 3.85 mA (2.5 mA/cm$^2$). The quantity of electricity discharged until the voltage decreased to 700 mV was 28 C. Accordingly, the energy density of the battery was 28 Wh per kg of the polyaniline and 7.4 Wh per kg of the total weight of the polyaniline and the electrolyte solution.

The zinc concentration in the electrolyte solution after discharge of 28 C was 1.25 mol/l as measured by atomic-absorption spectroscopy, indicating a remarkable increase as compared with the concentration before discharge.

COMPARATIVE EXAMPLE 3

A battery was produced in the same manner as in Example 3, except for using, as a cathode, a disc molded from 250 mg of the polyaniline doped with sulfuric acid as prepared in Reference Example 3.

The open-circuit voltage of the battery was 1,330 mV, and the voltage gradually decreased by constant current discharge at 3.85 mA (2.5 mA/cm$^2$). The quantity of electricity discharged until the voltage decreased to 700 mV was 46 C. Accordingly, the energy density of the battery was 46 Wh per kg of the polyaniline and 9.8 Wh per kg of the total weight of the polyaniline and the electrolyte solution.

The zinc concentration in the electrolyte solution after discharge of 46 C was 1.28 mol/l as measured by atomic-absorption spectroscopy, indicating a remarkable increase as compared with the concentration before discharge.

EXAMPLE 4

500 mg of the conducting polyaniline doped with polyvinylsulfonic acid as prepared in Reference Example 2 were dried in a vacuum drier at 110° C. for 8 hours and then tableted by a tableting press at a pressure of 500 kg/cm$^2$ to obtain a disc having a diameter of 13 mm.

A battery was produced by assembling the thus obtained disc as cathode 22, 30 mg of a lithium foil having a diameter of 14 mm as anode 23, a polypropylene porous sheet as a separator 24, and 0.3 ml of propylene carbonate containing 1 mol/l of lithium tetrafluoroborate (specific gravity: 1.282) as an electrolyte solution 26 within a battery cell 21. A stainless steel electrode having a diameter of 14 mm was used as an electrode 25 for collecting an electric current. The weight of the electrolyte solution was 0.77 times that of the polyaniline.

The open-circuit voltage of the battery was 3,410 mV. The voltage gradually decreased by constant current discharge at 3.85 mA (2.5 mA/cm$^2$). The quantity of electricity discharged until the voltage decreased to 2,500 mV was 25 C. Accordingly, the energy density of the battery was found to be 38 Wh per kg of the polyaniline and 23 Wh per kg of the total weight of the polyaniline and the electrolyte solution.

The lithium concentration in the electrolyte solution after electric discharge of 25 C was 1.05 mol/l as measured by atomic-absorption spectroscopy, which was substantially unchanged from that before discharge.

Further, the discharged battery could be recharged.

REFERENCE EXAMPLE 4

Synthesis of Polyaniline Doped with Hydroborofluoric Acid

In a 100 ml-volume glass-made rector was charged 42 g of distilled water, and 16.73 g of a 42% aqueous solution of hydroborofluoric acid was added thereto, followed by mixing with stirring by means of a magnetic stirrer. To the mixture 3.73 g (0.04 mol) of aniline was added and dissolved therein while stirring.

To the solution was added 3.48 g (0.04 mol) of a manganese dioxide powder in small portions while maintaining the solution at 3° C. by cooling with icewater. Thereafter, the reaction mixture was treated in the same manner as in Reference Example 2 to obtain 3.55 g of a conducting polyaniline doped with hydroborofluoric acid. The polymer had an electric conductivity of 1.5 S/cm.

COMPARATIVE EXAMPLE 4

A battery was produced in the same manner as in Example 4, except for using, as a cathode, a disc molded from 500 mg of the aniline polymer doped with hydroborofluoric acid as prepared in Reference Example 4.

The open-circuit voltage of the battery was 3,430 mV, and the voltage gradually decreased by constant current discharge at 3.85 mA (2.5 mA/cm$^2$). The quantity of electricity discharged until the voltage decreased to 2,500 mV was 16 C. Accordingly, the energy density of the battery was 24 Wh per kg of the polyaniline and 15 Wh per kg of the total weight of the polyaniline and the electrolyte solution.

The lithium concentration in the electrolyte solution after discharge of 16 C was 1.45 mol/l as measured by atomic-absorption spectroscopy, indicating a remarkable increase as compared with the concentration before discharge.

REFERENCE EXAMPLE 5

Synthesis of Polyallysulfonic Acid

In a 300 ml-volume separable flask equipped with a stirrer, a condenser, a means for introducing nitrogen, and a thermometer was charged 20 g of distilled water, and 0.33 g of 2,2'-azobis[2-methyl-N-[1,1-bis(hydroxymethyl)ethyl]propionamide] (produced by Wako Pure Chemical Ind., Ltd.) was added thereto as a radical initiator and dissolved therein at 60° C. After introducing nitrogen gas for 10 minutes, 64 g of sodium allylsulfonate was added to the solution in small portions and dissolved under heating at 90° C. by means of a mantle heater. The initial concentration of the sodium allylsulfonate monomer was 75.9%.

After the whole amount of the sodium allylsulfonate was dissolved, nitrogen gas was again blown thereinto for 10 minutes, followed by polymerizing at 100° C. for 6.5 hours in a nitrogen stream. After allowing the reaction mixture to stand at room temperature overnight, the polymerization solution was diluted with 80 g of distilled water and poured into 1,600 ml of methanol to obtain a white precipitate.

The white precipitate was collected by filtration through a glass filter and dried in vacuo at 80° C. for 7 hours to obtain 20.46 g of a sodium allylsulfonate homopolymer powder. The yield was 32.0%. The resulting polymer had a logarithmic viscosity number of 0.052 as determined in water at 30° C. at a concentration of 0.5 g/dl. Gel permeation chromatography of the polymer revealed that the number-average molecular weight ($\overline{Mn}$) was 2,200 and $\overline{Mw}/\overline{Mn}$ (wherein $\overline{Mw}$ is a weight average molecular weight) was 1.07, indicating a very narrow molecular weight distribution.

In 41.2 g of distilled water was dissolved 10.31 g of the the resulting sodium polyallylsulfonate to prepare a 20% aqueous solution. A glass column packed with an H-type strongly acidic cation-exchange resin ("Dowex 50 WX 12, H type" produced by Dow Chemical Co., Ltd.) was thoroughly washed with distilled water. After confirming that the washing became neutral, the above-prepared sodium polyallylsulfonate aqueous solution was supplied to the column by means of a quantitative pump. The effluent was collected from the point when it became acidic to the point when it approached near to neutrality.

When a part of the resulting effluent was titrated with a 1/100 N sodium hydroxide aqueous solution, the concentration of the polyallylsulfonic acid in the effluent was found to be 1.32 mol/l. Thus, 54 ml of a polyallylsulfonic acid solution was obtained.

REFERENCE EXAMPLE 6

Synthesis of Polyaniline Doped with Polyallylsulfonic Acid

In a 200 ml-volume glass reactor was charged 50 ml of the 1.2 mol/l polyallylsulfonic acid aqueous solution as prepared in Reference Example 5, and 2.05 g (0.022 mol) of aniline was added thereto, followed by stirring to dissolve and, at the same time, cooling with ice-water to 4° C. Separately, 40 ml of distilled water was put in a 50 ml-volume glass-made test tube, and 1.43 g (0.0165 mol) of manganese dioxide was added thereto, followed by ultrasonic dispersion for 30 minutes.

The manganese dioxide dispersion was then added to be aniline solution in small portions while stirring under cooling. The reaction mixture turned from blackish blue to blackish green, and a blackish green solid was then formed. The manganese dioxide dispersion was added over about 30 minutes, and the stirring was further continued for an additional 1.5 hour. The stirring was stopped, and the mixture was allowed to stand at room temperature overnight and then treated in the same manner as described in Reference Example 2 to obtain 1.97 g of a polyaniline as bright green powder. The resulting polymer had an electric conductivity of 5.9 S/cm.

EXAMPLE 5

30 mg of the polyaniline doped with polyallylsulfonic acid as obtained in Reference Example 6 were dried in a vacuum drier at 100° C. for 3 hours and molded by a tableting press at a pressure of 500 kg/cm$^2$ to obtain a disc having a diameter of 10 mm.

As shown in FIG. 2, a battery was produced by assembling the thus obtained disc as a cathode 22, 14 mg of a lithium foil having a diameter of 13 mm and having a thickness of 0.2 mm as an anode 23, a polypropylene porous sheet as a separator 24, and 0.073 ml of dimethyl sulfoxide containing 1 mol/l of lithium tetrafluoroborate (specific gravity: 1.15) as an electrolyte solution 26 within a battery cell 21. A stainless steel electrode having a diameter of 14 mm was used as an electrode 25 for collecting an electric current. The weight of the electrolyte solution was 2.8 times that of the polyaniline.

The open-circuit voltage of the battery was 3,700 mV. The voltage gradually decreased by constant current discharge at 0.393 mA (0.5 mA/cm$^2$). The quantity of electricity discharged until the voltage decreased to 2,000 mV was 4.4 C. Accordingly, the energy density of the battery was found to be 122 Wh per kg of the polyaniline and 35 Wh per kg of the total weight of the polyaniline and the electrolyte solution.

The lithium concentration in the electrolyte solution after electric discharge of 4.4 C was 1.03 mol/l as measured by atomic-absorption spectroscopy, which was substantially unchanged from that before discharge.

Figure 3:
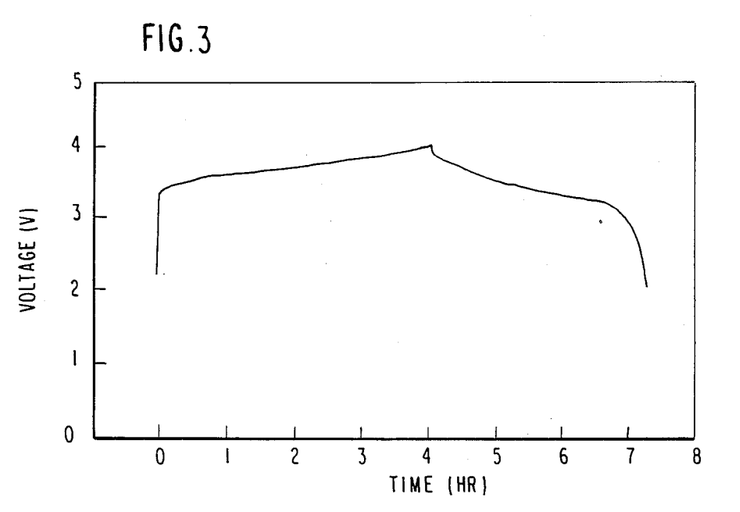
FIG. 3 is an example of the charge and discharge curve of the battery obtained in Example 5.

An example of the charge and discharge curve of the battery after repeating charge and discharge ten times is shown in FIG. 3.

COMPARATIVE EXAMPLE 5

A battery was produced in the same manner as in Example 5, except for using a disc having a diameter of 10 mm molded from the polyaniline doped with hydroborofluoric acid as prepared in Reference Example 4 as a cathode. After assembling, the disc swelled in the electrolyte solution to a diameter of 13 mm.

The open-circuit voltage of the battery was 3,800 mV. The voltage gradually decreased by constant current discharge at 0.664 mA (0.5 mA/cm$^2$). The quantity of electricity discharged until the voltage decreased to 2,000 mV was 3.5 C. Accordingly, the energy density of the battery was 105 Wh per kg of the weight of the polyaniline and 31 Wh per kg of the total weight of the polyaniline and the electrolyte solution.

The lithium concentration in the electrolyte solution after discharge of 3.5 C was 1.54 mol/l as measured by atomic-absorption spectroscopy, indicating a remarkable increase as compared with the concentration before discharge.

REFERENCE EXAMPLE 7

Preparation of Ferric Hydroxide-1

In 100 ml of distilled water was dissolved 27.54 g (0.102 mol) of ferric chloride hexahydrate (FeCl$_3$·6H$_2$O), and the solution was gradually added dropwise to 307 ml (0.307 mol) of a 1 mol/l aqueous solution of sodium hydroxide. The thus formed precipitate of ferric hydroxide was separated by filtration through a glass filter and thoroughly washed with distilled water. The resulting ferric hydroxide was used as such in the subsequent reaction without being dried.

REFERENCE EXAMPLE 8

Synthesis of Polyvinylsulfonic Acid-2

Water was removed from 547 g of a 25% aqueous solution of sodium vinylsulfonate (produced by Tokyo Chemical Industry Co., Ltd.) by using a rotary evaporator to concentrate the solution to a weight of 342 g (concentration: 40%).

The whole amount of the concentrated aqueous solution of sodium vinylsulfonate was placed in a separable flask equipped with a stirrer, a means for introducing nitrogen, and a condenser, and nitrogen was then bubbled into the solution for 15 minutes.

In 17 g of distilled water were dissolved 0.852 g of potassium peroxodisulfate and 0.433 g of sodium hydrogensulfite to prepare an aqueous solution of a redox initiator. The resulting solution was added to the solution in the separable flask, followed by stirring at room temperature. About 1 hour later, an increase in viscosity of the solution was observed.

After the mixture was allowed to react for 9 hours, the reaction mixture was poured into 1,700 ml of methanol while stirring to thereby form a white precipitate. The precipitate was collected by filtration using a glass filter, thoroughly washed with methanol, and dried in vacuo at 70° C. for 8 hours to obtain 90.2 g (66%) of sodium polyvinylsulfonate as a white powder.

The resulting polymer had a logarithmic viscosity number of 0.19 (0.5 g/dl, 30° C., in water). When viscosity was measured using a Ubbelohde's viscometer while decreasing the polymer concentration, the polymer showed a phenomenon called low concentration abnormality in which both of logarithmic viscosity number and reduced viscosity increase as the concentration decreases. This means that the resulting polymer is a high polymeric electrolyte.

50 g of the resulting sodium polyvinylsulfonate was dissolved in 200 ml of distilled water. The aqueous solution was ion exchanged in the same manner as in Reference Example 1, and the effluent having a pH of 2.0 or smaller was collected to obtain about 370 ml of a fraction. The resulting fraction was concentrated to 50 ml by means of an evaporator.

REFERENCE EXAMPLE 9

Synthesis of Polypyrrole Doped with Polyvinylsulfonate

To 50 ml of the polyvinylsulfonic acid obtained in Reference Example 8 was added the ferric hydroxide as obtained in Reference Example 7 to form a solution. When 3.54 ml (0.0512 mol) of pyrrole was added to the solution, the reaction liquid formed a precipitate and colored in black.

The reaction liquid was subjected to centrifugation at 3,000 rpm. The solid was collected by filtration through a glass filter, thoroughly washed with distilled water and then with acetone, and dried under reduced pressure to obtain 3.32 g of a conducting organic polymer doped with polyvinylsulfonate as a black powder. The resulting polymer had an electrical conductivity of 4 S/cm.

EXAMPLE 6

A disc having a diameter of 13 mm was molded from 250 mg of the conducting polypyrrole powder doped with polyvinylsulfonate prepared in Reference Example 9 by pressing using a tableting press at a pressure of 1,130 kg/cm$^2$.

A battery was produced in the same manner as in Example 1, except for replacing the conducting organic polymer as used in Example 1 with the disc of the polypyrrole doped with polyvinylsulfonate and changing the amount of the electrolyte solution to 0.6 ml. In this battery, the weight of the electrolyte solution was 2.8 times that of the polypyrrole.

The open-circuit voltage of the battery was 1,220 mV, and the voltage gradually decreased by constant current discharge at 1.93 mA (1.0 mA/cm$^2$). The quantity of electricity discharged until the voltage decreased to 700 mV was 34 C. Accordingly, the energy density of the battery was 31 Wh per kg of the polypyrrole weight and 8.2 Wh per kg of the total weight of the polypyrrole and the electrolyte solution.

The zinc concentration in the electrolyte solution after discharge of 34 C was 1.03 mol/l as measured by atomic-absorption spectroscopy, which was substantially unchanged from that before discharge.

Further, the battery could be recharged.

REFERENCE EXAMPLE 10

Synthesis of Polypyrrole Doped with Sulfate

In 200 ml of distilled water was dissolved 50 g of ferric sulfate [Fe$_2$(SO$_4$)$_3$]. When 6.7 ml (0.097 mol.) of pyrrole was added to the solution, the solution formed a precipitate and showed a black color. The precipitate formed was collected by filtration through a glass filter, thoroughly washed with distilled water and then with acetone, and dried under reduced pressure to obtain 5.94 g of a conducting polypyrrole doped with sulfate as a black powder. The resulting polymer had an electrical conductivity of 1.2 S/cm.

COMPARATIVE EXAMPLE 6

A battery was produced in the same manner as in Example 6, except for using a disc molded from 250 mg of the conducting polypyrrole doped with sulfate as obtained in Reference Example 10 as a cathode.

The open-circuit voltage of the battery was 1,290 mV, and the voltage gradually decreased by constant current discharge at 1.93 mA (1.0 mA/cm$^2$). The quantity of electricity discharged until the voltage decreased to 700 mV was 24 C. Accordingly, the energy density of the battery was 22 Wh per kg of the polypyrrole weight and 5.7 Wh per kg of the total weight of the polypyrrole and the electrolyte solution.

The zinc concentration in the electrolyte solution after discharge of 24 C was 1.21 mol/l as measured by atomic-absorption spectroscopy, showing a remarkable increase as compared with the concentration before discharge.

EXAMPLE 7

20 mg of the polypyrrole doped with polyvinylsulfonate as obtained in Reference Example 9 were dried in vacuo at 100° C. for 3 hours and pressed using a tableting press at a pressure of 500 kg/cm$^2$ to obtain a disc having a diameter of 10 mm.

A battery was produced in the same manner as in Example 5, except for using the above obtained disc of the polypyrrole doped with polyvinylsulfonate as a cathode and changing the amount of the electrolyte solution to 0.049 ml. In this battery, the weight of the electrolyte solution was 2.8 times that of the polypyrrole.

The open-circuit voltage of the battery was 3,500 mV, and the voltage gradually decreased by constant current discharge at 0.393 mA (0.5 mA/cm$^2$). The quantity of electricity discharged until the voltage decreased to 2,000 mV was 1.8 C. Accordingly, the energy density of the battery was 68 Wh per kg of the polypyrrole weight and 18 Wh per kg of the total weight of the polypyrrole and the electrolyte solution.

The lithium concentration in the electrolyte solution after electric discharge of 1.8 C was 0.98 mol/l as measured by atomic-absorption spectroscopy, which was substantially unchanged from that before discharge.

Further, the battery could be recharged.

REFERENCE EXAMPLE 11

Preparation of Ferric Hydroxide-2

In 5 ml of distilled water was dissolved 1.46 g (0.0054 mol) of ferric chloride hexahydrate (FeCl$_3$.6H$_2$O). and the solution was gradually added dropwise to 16.2 ml (0.0162 mol) of a 1 mol/l aqueous solution of sodium hydroxide. The thus formed precipitate of ferric hydroxide was separated by filtration through a glass filter and thoroughly washed with distilled water.

The resulting ferric hydroxide was used as such in the subsequent reaction without being dried.

REFERENCE EXAMPLE 12

Synthesis of Polypyrrole Doped with Tetrafluoroborate

In a mixture of 3.34 g (0.0162 mol) of a commercially available 42% aqueous solution of hydroborofluoric acid and 5 ml of distilled water was dissolved the ferric hydroxide as obtained in Reference Example 11.

When 0.187 mol (0.0027 mol) of pyrrole was added to the resulting solution, a precipitate was formed and the reaction mixture showed a black color. The formed precipitate was collected by filtration through a glass filter, thoroughly washed with distilled water and then with acetone, and dried under reduced pressure to obtain 155 mg of a conducting polypyrrole doped with tetrafluoroborate as a black powder. The resulting polymer had an electrical conductivity of 5.5 S/cm.

COMPARATIVE EXAMPLE 7

A battery was produced in the same manner as in Example 7, except for using the conducting polypyrrole doped with tetrafluoroborate prepared in Reference Example 12 as a cathode.

The open-circuit voltage of the battery was 3,500 mV, and the voltage gradually decreased by constant current discharge at 0.393 mA (0.5 mA/cm$^2$). The quantity of electricity discharged until the voltage decreased to 2,000 mV was 1.1 C. Accordingly, the energy density of the battery was 41 Wh per kg of the polypyrrole weight and 11 Wh per kg of the total weight of the polypyrrole and the electrolyte solution.

The lithium concentration in the electrolyte solution after discharge of 1.1 C was 1.21 mol/l as measured by atomic-absorption spectroscopy, showing a remarkable increase as compared with the concentration before discharge.

While the invention has been described in detail and with reference to specific embodiments thereof, it will be apparent to one skilled in the art that various changes and modifications can be made therein without departing from the spirit and scope thereof.

What is claimed is:

1. A conducting organic polymer battery comprising
    a cathode comprising a conducting organic polymer doped with a polymer anion having a number of anionic groups in the molecule thereof,
    an anode comprising a metal having a redox potential lower than that of the conducting organic polymer, and
    an electrolyte solution as an ion conductive phase.

2. A conducting organic polymer battery as claimed in claim 1, wherein said conducting organic polymer is a p-type conducting organic polymer which is cationic and is doped with a polymer anion.

3. A conducting organic polymer battery as claimed in claim 1, wherein said conducting organic polymer is a polymer prepared by oxidative polymerization of pyrrole, a pyrrole derivative having a substituent at the nitrogen atom, 3- and/or 4-positions thereof, thiophene, a thiophene derivative having a substituent at the 3- and/or 4-positions thereof, furan, a furan derivative having a substitutent at the 3- and/or 4-positions thereof, aniline, an alkyl-substituted aniline, phenol or thiophenol; poly(p-phenylene); or polyacetylene.

4. A conducting organic polymer battery as claimed in claim 1, wherein said conducting organic polymer is selected from the group consisting of polythiophene, polyaniline, polyalkylaniline, poly-N-methylpyrrole, polypyrrole, poly(p-phenylene) and polyacetylene.

5. A conducting organic polymer battery as claimed in claim 1, wherein said metal is selected from the group consisting of lithium, lithium alloy, zinc and magnesium.

6. A conducting organic polymer battery comprising
    a cathode comprising a conducting organic polymer doped with a polymer anion having a number of anionic groups in the molecule thereof,
    an anode comprising a metal having a redox potential lower than that of the conducting organic polymer, and
    a solid electrolyte as an ion conductive phase.

7. A conducting organic polymer battery as claimed in claim 6, wherein said conducting organic polymer is a p-type conducting organic polymer which is cationic and is doped with a polymer anion.

8. A conducting organic polymer battery as claimed in claim 6, wherein said conducting organic polymer is a polymer prepared by oxidation polymerization of pyrrole, a pyrrole derivative having a substituent at the nitrogen atom, 3- and/or 4-positions thereof, thiophene, a thiophene derivative having a substituent at the 3- and/or 4-positions thereof, furan, a furan derivative having a substitutent at the 3- and/or 4-positions thereof, aniline, an alkyl-substituted aniline, phenol or thiophenol; poly(p-phenylene); or polyacetylene.

9. A conducting organic polymer battery as claimed in claim 6, wherein said conducting organic polymer is selected from the group consisting of polythiophene, polyaniline, polyalkylaniline, poly-N-methylpyrrole, polypyrrole, poly(p-phenylene) and polyacetylene.

10. A conducting organic polymer battery as claimed in claim 6, wherein said metal is selected from the group consisting of lithium, lithium alloy, zinc and magnesium.

* * * * *